(12) United States Patent
Proud et al.

(10) Patent No.: US 7,712,571 B2
(45) Date of Patent: May 11, 2010

(54) ERGONOMIC MACHINE CONTROL CONSOLE

(75) Inventors: Marc D. Proud, Glasford, IL (US); Patrick Andrew Pryor, Peoria, IL (US); Timothy J. Silvers, Pekin, IL (US)

(73) Assignee: Caterpillar Inc., Peoria, IL (US)

( * ) Notice: Subject to any disclaimer, the term of this patent is extended or adjusted under 35 U.S.C. 154(b) by 817 days.

(21) Appl. No.: 11/473,115

(22) Filed: Jun. 23, 2006

(65) Prior Publication Data

US 2007/0295551 A1   Dec. 27, 2007

(51) Int. Cl.
*B60K 26/00* (2006.01)

(52) U.S. Cl. ........................ 180/331; 180/333; 180/334; 74/491

(58) Field of Classification Search ................. 180/331, 180/332, 333, 334, 335, 336; 74/491; 297/183.9, 297/463.1
See application file for complete search history.

(56) References Cited

U.S. PATENT DOCUMENTS

| | | | |
|---|---|---|---|
| 3,580,636 A | 5/1971 | Setto | |
| 4,055,230 A | 10/1977 | Kestian et al. | |
| 4,140,200 A | 2/1979 | Tucek | |
| 4,200,166 A | 4/1980 | Hansen | |
| 4,392,546 A | 7/1983 | Brown et al. | |
| 4,476,954 A | 10/1984 | Johnson et al. | |
| 4,478,308 A | 10/1984 | Klaasen | |
| 4,541,497 A * | 9/1985 | Riediger et al. | 180/6.48 |
| 4,574,651 A | 3/1986 | Nordstrom | |
| 4,699,239 A | 10/1987 | Ishino et al. | |
| 4,702,520 A | 10/1987 | Whisler et al. | |
| 4,738,417 A | 4/1988 | Wenger | |
| 4,895,039 A | 1/1990 | Hegg | |
| 4,895,040 A | 1/1990 | Soederberg | |
| 4,914,976 A | 4/1990 | Wyllie | |
| 5,042,314 A | 8/1991 | Rytter et al. | |
| D323,279 S | 1/1992 | Soederberg | |
| 5,086,870 A | 2/1992 | Bolduc | |
| 5,182,961 A | 2/1993 | Menahem et al. | |
| 5,244,066 A | 9/1993 | Mackoway et al. | |
| 5,286,078 A | 2/1994 | Mottino et al. | |
| 5,326,063 A | 7/1994 | Stevens | |
| 5,379,663 A | 1/1995 | Hara | |
| 5,429,037 A | 7/1995 | Weber et al. | |
| 5,448,028 A | 9/1995 | Filion et al. | |
| 5,503,040 A | 4/1996 | Wright | |
| 5,566,778 A | 10/1996 | Valier et al. | |
| 5,805,256 A | 9/1998 | Miller | |
| 5,887,669 A | 3/1999 | Ostler et al. | |

(Continued)

*Primary Examiner*—Toan C To
(74) *Attorney, Agent, or Firm*—Finnegan, Henderson, Farabow, Garrett & Dunner

(57) ABSTRACT

A control console for a machine having a seat with a plane of symmetry is disclosed. The machine also has an armrest extending from the seat in a forward direction generally parallel with the plane of symmetry. The armrest has an upper surface intended to support an operator's forearm. The control console includes a base operatively connected to the armrest, and at least one operator interface device operatively connected to the base. The at least one operator interface device has a neutral axis inclined at an oblique angle relative to the upper surface of the armrest. The at least one operator interface device is pivotal in a fore/aft direction to initiate only a single function of the machine, the fore/aft direction being rotated outward away from the seat a predetermined angle relative to the forward direction of the armrest.

17 Claims, 4 Drawing Sheets

U.S. PATENT DOCUMENTS

| | | |
|---|---|---|
| 5,924,515 A | 7/1999 | Stauffer |
| 5,938,282 A | 8/1999 | Epple |
| 5,960,903 A | 10/1999 | Abels et al. |
| H1831 H | 2/2000 | Kelly et al. |
| 6,039,141 A | 3/2000 | Denny |
| 6,065,365 A | 5/2000 | Ostler et al. |
| D427,207 S | 6/2000 | Altmann et al. |
| D429,246 S | 8/2000 | Holma |
| 6,164,285 A | 12/2000 | Garberg et al. |
| 6,276,749 B1 | 8/2001 | Okazawa et al. |
| D463,459 S | 9/2002 | Tamaru et al. |
| 6,612,636 B2 * | 9/2003 | Arthur et al. ............... 296/71 |
| 6,631,652 B1 * | 10/2003 | Okazawa et al. ........ 74/471 XY |
| 6,634,453 B2 * | 10/2003 | Arthur et al. ................. 180/315 |
| 6,636,200 B2 | 10/2003 | Kataoka et al. |
| 6,643,577 B1 | 11/2003 | Padgett et al. |
| 6,650,985 B2 | 11/2003 | Lin et al. |
| 6,971,194 B2 * | 12/2005 | McClelland et al. ........... 37/347 |
| 7,032,703 B2 * | 4/2006 | Wulfert et al. ............... 180/329 |
| 7,036,250 B2 * | 5/2006 | Dressler et al. ................ 37/466 |
| 7,234,561 B2 * | 6/2007 | Hock et al. ................. 180/326 |
| 7,290,635 B2 * | 11/2007 | Bisick et al. ................. 180/272 |
| 7,458,439 B2 * | 12/2008 | Catton et al. ................. 180/334 |
| 7,484,587 B2 * | 2/2009 | Portscheller et al. ......... 180/329 |
| 2007/0017728 A1 * | 1/2007 | Sano .......................... 180/334 |

* cited by examiner

ERGONOMIC MACHINE CONTROL CONSOLE

TECHNICAL FIELD

The present disclosure is directed to a control console and, more particularly, to an ergonomic machine control console designed to relieve operator fatigue.

BACKGROUND

Machines such as, for example, wheel loaders, motor graders, agricultural tractors, and other types of heavy equipment have a variety of tools attached to and controlled by the machine's operator. These tools can be relatively complicated and difficult to operate. Each tool may have a different operator interface with numerous controls for position, orientation, and other associated features and functions.

Historically, machines have incorporated large, permanently located levers with complex mechanical linkages, multiple operating joints, and cables to provide the desired work tool functionality. Machines with such multiple control mechanisms required operators with high skill levels. After a period of operating these control mechanisms, the operators became fatigued, with no way to rest the hand or arm while operating the various control mechanisms. Further, because an operator's hand was required to travel from one actuating element to another, there may have been a delay between work tool manipulation that resulted in poor quality and/or low production. Also, because these control mechanisms were fixed in a permanent location, they may have been inefficiently and/or non-ergonomically located for all machine operators.

One example of an operator interface designed to reduce operator fatigue and response time while improving results of the machine is described in U.S. Pat. No. 6,164,285 (the '285 patent) issued to Garberg et al. on Dec. 26, 2000. The '285 patent describes a control console for a mobile machine that is connected to a seat within a cab of the machine. The control console extends along an axis which is angled away from a seat plane, when viewed from above the seat. The console has a plurality of single axis control levers mounted on a platform along a horizontal lever axis vertically aligned with an armrest. The platform is vertically movable relative to the seat. As the platform moves, the lever axis remains at a constant angle relative to the seat plane.

Although the console of the '285 patent may have alleviated some of the problems associated with separate machine controls and operator fatigue, the console does not provide enough support or adjustability to the machine operator. In particular, the location of the control levers does not correspond with the natural angle of an operator's hand at rest. In addition, because the console is adjustable in only a single direction, it may still be inadequate for some operators.

The disclosed control console is directed toward overcoming one or more of the problems set forth above.

SUMMARY OF THE INVENTION

In one aspect, the present disclosure is directed to a control console associated with an armrest extending from a seat in a forward direction generally parallel with a seat plane of symmetry. The armrest has an upper surface intended to support an operator's forearm. The control console includes a base operatively connected to the armrest, and at least one operator interface device operatively connected to the base. The at least one operator interface device has a neutral axis inclined at an oblique angle relative to the upper surface of the armrest. The at least one operator interface device is pivotal in a fore/aft direction to initiate only a single function, the fore/aft direction being rotated outward away from the seat a predetermined angle relative to the forward direction of the armrest.

In another aspect, the present disclosure is directed to a method of controlling a machine. The method includes engaging a forearm with a first rest along the length of the forearm, and simultaneously adjusting a location of a second rest and at least one operator control device relative to the first rest. The method also includes positioning a palm on the second rest, and adjusting the location of the second rest relative to the first rest and the at least one operator control device. The method further includes actuating the at least one operator control device to control a function of machine.

DETAILED DESCRIPTION

Figure 1:
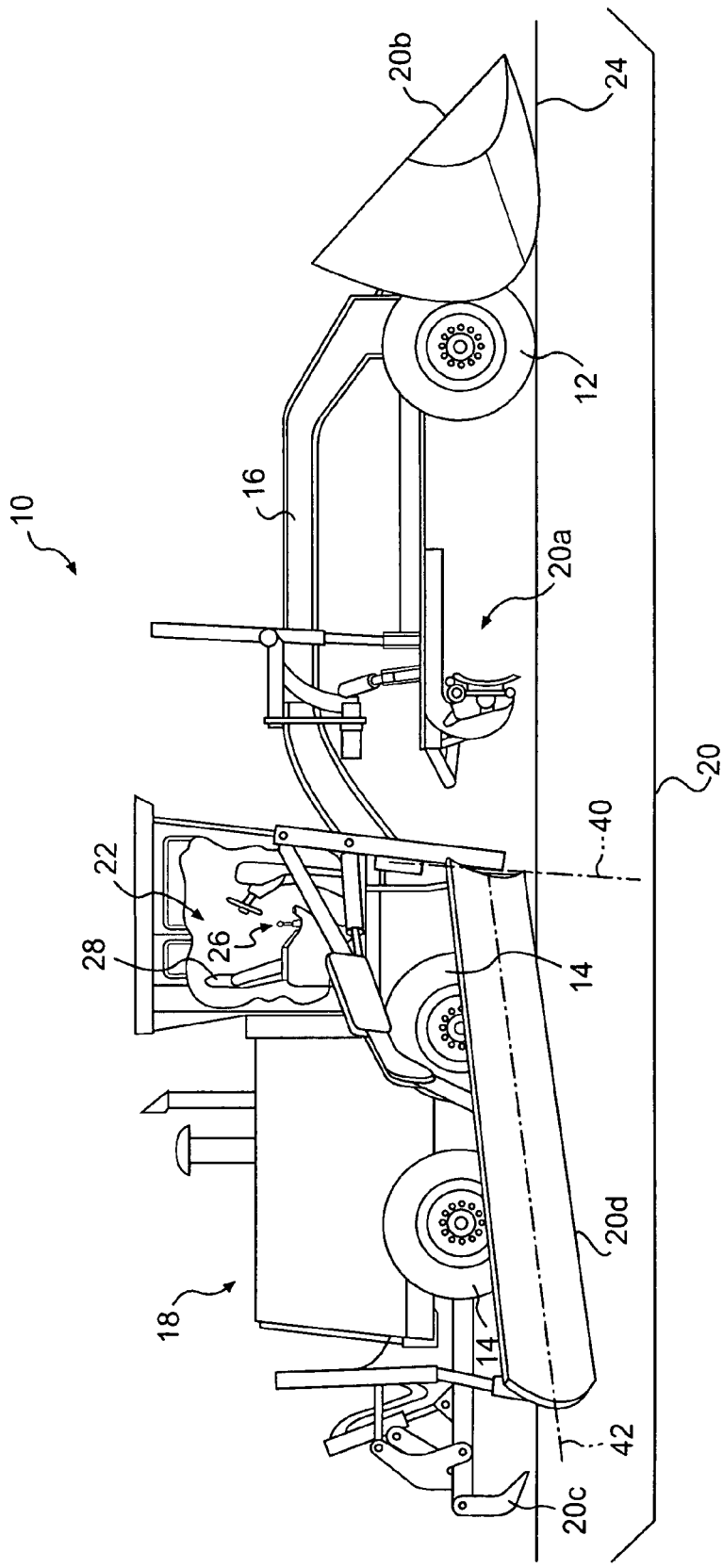
FIG. 1 is a diagrammatic illustration of an exemplary disclosed machine.

An exemplary embodiment of a machine 10 is illustrated in FIG. 1. Machine 10 may embody a fixed or mobile machine that performs some type of operation associated with an industry such as mining, construction, farming, transportation, or any other industry known in the art. For example, machine 10 may be an earth moving machine such as a wheel loader, an excavator, a motor grader, or any other earth moving machine. Machine 10 may include a steerable traction device 12, a driven traction device 14, and a frame 16 connecting steerable traction device 12 to driven traction device 14. Machine 10 may also include one or more work tools 20 and an operator station 22.

Both steerable and driven traction devices 12, 14 may include one or more wheels located on each side of machine 10 (only one side shown). Alternatively, steerable and/or driven traction devices 12, 14 may include tracks, belts, or other traction devices known in the art. Steerable traction devices 12 may or may not also be driven, while driven traction device 14 may or may not also be steerable. Frame 16 may connect steerable traction device 12 to driven traction device 14 by way of, for example, an articulated joint (not shown).

Numerous different work tools 20 may be attachable to a single machine 10 and controllable via a control console 26 located within operator station 22. Work tool 20 may include any device used to perform a particular task such as, for example, a blade 20a, a plow 20b, a ripper 20c, a sidewing 20d, a bucket, a scarifier, a broom, a snow blower, or any other task-performing device known in the art. Although connected in the disclosed embodiment of FIG. 1 to lift, rotate, and tilt relative to work machine 10, work tools 20 may alternatively or additionally slide, swing, or move in any other manner known in the art.

Figure 2:
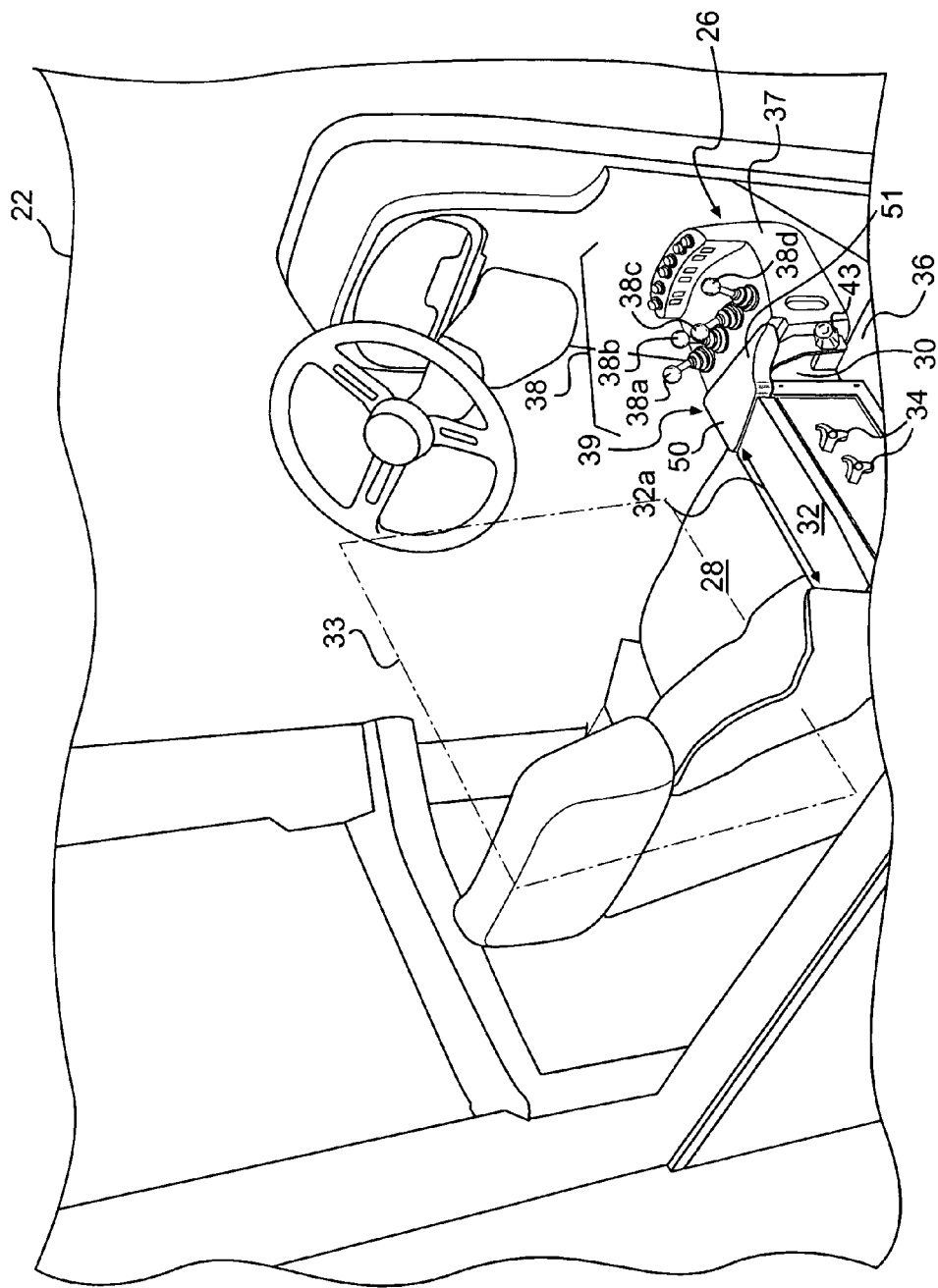
FIG. 2 is a pictorial illustration of an exemplary disclosed operator station for use with the machine of FIG. 1.

Operator station 22 may house a movable control console 26. In particular, as illustrated in the example of FIG. 2, operator station 22 may include a seat 28, with control console 26 being adjustably attached to seat 28. Control console 26 may include an extendable arm member 30 slidably received within an armrest 32 of seat 28 such that control console 26 may slide in a fore/aft direction relative to seat 28, as represented by an arrow 32a. For the purposes of this disclosure, although the fore/aft direction may be defined at least partially by the relative movement between control console 26 and armrest 32, the fore/aft direction may also or alternatively be defined in relation to seat 28 and/or the location of and movement of an operators forearm. In the example of FIG. 2, seat 28 may include a vertical plane of symmetry 33, about which seat 28 is substantially horizontally symmetric. The fore/aft direction, in this example, may be substantially parallel with plane 33 and substantially parallel with un upper surface of armrest 32 upon which an operator's forearm rests during operation of machine 10. With respect to an operator's forearm, when the operator is properly situated within seat 28, the forearm is kept in contact with armrest 32 along the length of armrest 32, and the upper arm is rotated about the shoulder joint in a plane substantially parallel to plane 33, the forearm movement may be in the fore/aft direction.

One or more fastening devices 34 may secure control console 26 to seat 28 in an operator-selected fore/aft position. It is contemplated that control console 26 may alternatively be connected to a floor 36 of operator station 22, to a wall (not shown) of operator station 22, or in any other manner known in the art. Control console 26 may further include a base 37, a palm rest 39 connected to move fore/aft with base 37 and vertically relative to base 37, and one or more operator interface devices 38 located forward of palm rest 39 for control of work tools 20 and/or machine 10.

Base 37 may embody a generally rectangular housing configured to support palm rest 39 on one upper portion thereof, and operator interface devices 38 on another upper portion. Base 37 may enclose and protect the internal mechanisms and electronics of operator interface devices 38, as well as the electronic connections between operator interface devices 38 and a control module (not shown) located elsewhere on machine 10. It is contemplated that the control module could alternatively be located within control consol 26, if desired. As indicated above, base 37 may mount to armrest 32 via arm member 30 and fastening devices 34.

A vertical inner surface 41 of base 37 may be angled outward away from the operator. That is, in order to provide adequate leg room for the operator of machine 10, vertical inner surface 41 (that is, the inner surface of base 37 that is substantially parallel to plane 33) may be rotated outward away from plane 33 to an angle within the range of 6-18 degrees, and most optimally to an angle of about 12 degrees. It is contemplated that a corresponding vertical outer surface of base 37 may be similarly rotated, if desired.

Palm rest 39 may include a substantially flat upper surface 50 and a front oblique surface 51 of a substantially triangular shape. Palm rest 39 may include padding configured to support and cushion an operator's palm and may be operatively connected to move in the fore/aft direction with control console 26. In particular, a fastening device 43 may connect palm rest 39 to control console 26 such that palm rest 39 may vertically move between a lower position at which a top of palm rest 39 is substantially aligned with a top of armrest 32, and an upper position. It is contemplated that palm rest 39 may alternatively be permanently fixed to control console 26, if desired. Although FIG. 2 illustrates palm rest 39 as intended for a right-handed operator, it is contemplated, however, that palm rest 39 may be similarly fashioned for a left-handed operator.

In one embodiment, operator interface devices 38 may include single axis levers (SALs) 38a, b, c, and d. It is contemplated, however, that, instead of SALs, operator interface devices 38 may alternatively include multi-axis levers, wheels, knobs, or other operator interface devices that require at least a generally fore/aft movement input from the operator for actuation.

SALs 38a, b, c, and d may each control a particular motion of one or more of work tools 20. In particular, a forward-tilting movement of SAL 38a may cause blade 20a to lower towards work surface 24. An aft-tilting movement of SAL 38a may cause blade 20a to raise away from work surface 24. A forward-tilting movement of SAL 38b may cause blade 20a to shift to the right relative to an operator's perspective. An aft-tilting movement of SAL 38b may cause blade 20a to shift to the left. A forward-tilting movement of SAL 38c may cause blade 20a to rotate clockwise about a central vertical axis 40. An aft-tilting movement of SAL 38c may cause blade 20a to rotate counter-clockwise about central vertical axis 40. A forward-tilting movement of SAL 38d may cause blade 20a to rotate clockwise about a horizontal axis 42 such that an upper portion of the blade tilts forward toward work surface 24. An aft-tilting movement of SAL 38d may cause blade 20a to rotate counter-clockwise about horizontal axis 42. It is contemplated that different motions of SALs 38a-d may be associated with different blade movements. It is further contemplated that SALs 38a-d may control additional and/or different work tools 20 or functions of machine 10. For example, SALs 38a-d may control the movement of plow 20b, the movement of ripper 20c, the movement of sidewing 20d, machine steering, machine articulation, wheel tilt, a transmission function, an engine function, and other functions of machine 10 that are known in the art.

Figure 3A:
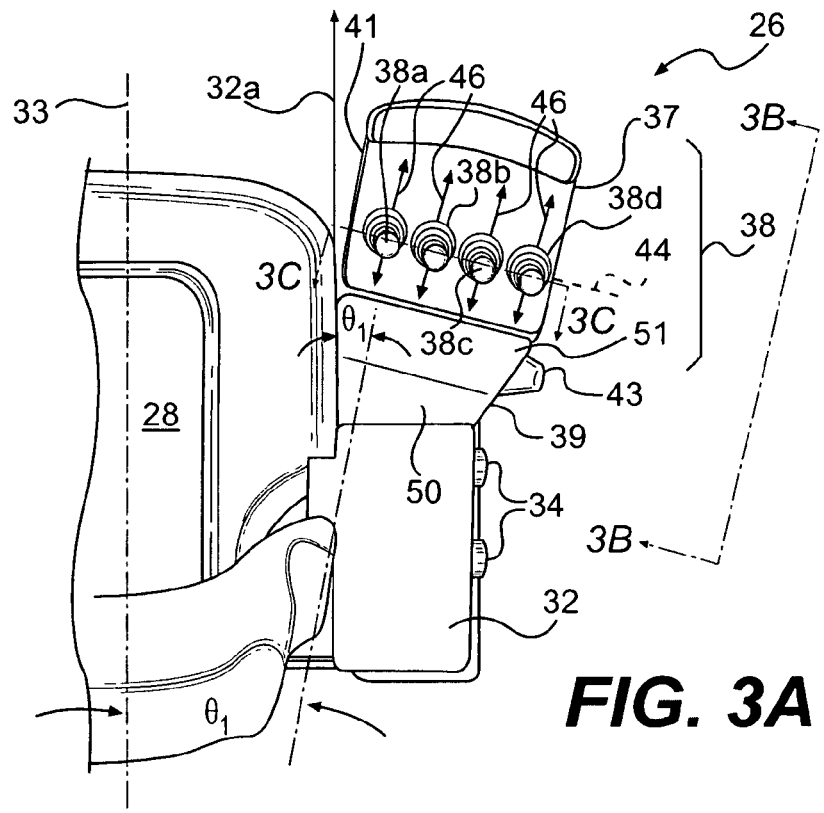
FIG. 3A is a top view diagrammatic illustration of an exemplary disclosed control console for use with the operator station of FIG. 2.

Operator interface devices 38 may be co-aligned. That is, regardless of the type of operator interface devices 38 included within control console 26, if multiple operator interface devices 38 are included within control console 26, at least two of operator interface devices 38 may be co-aligned in some manner. In the embodiment of FIG. 3A, SALs 38a-d are illustrated as being aligned along a common axis 44, wherein all tilting movement of SALs 38a-d may be about common axis 44. Alternatively, each of SALs 38a-d may tilt about different axis that are misaligned, but parallel. In this situation, two or more SAL pivot points (e.g., the intersection of the individual tilt axis with the fore/aft movement of each SAL 38a-d) may align with common axis 44, rather than the individual tilt axis.

If operator interface devices 38 other than SALs are implemented within control console 26, the movement of these operator interface devices 38 may also be aligned about common axis 44. For example, multi-axis lever may be movable in a fore/aft direction in which only a first function of machine 10 is initiated, in a transverse direction in which only a second function of machine 10 is initiated, and, possibly, in a direction between the fore/aft and transverse directions such that both the first and second functions are initiated. In this arrangement, at least one of the fore/aft and transverse tilting axis of one or more multi-axis levers may be co-aligned about common axis 44.

SALs 38a-d may be neutral biased. In particular, SALs 38a-d may be biased to a position within the fore/aft range of motion described above at which substantially no function of machine 10 is initiated. When in this neutral position, a stem portion of SALs 38a-d may align with a neutral axis 52.

Operator interface devices 38 may be oriented relative to armrest 32 in a manner that relieves stress on the forearm of an operator properly situated in seat 28. In particular, the fore/aft tilting of SALs 38a-d about common axis 44, represented by arrows 46 in FIG. 3A, may be in a plane situated at an angle $\theta_1$ relative to plane 33 and/or the fore/aft direction of armrest 32 (e.g., arrow 32a described above). Angle $\theta_1$ may correspond to the natural angle at which the hand of an operator tends to rotate outward away from the body and away from axial alignment with the forearm, when viewed from above with the palm of the operator's hand facing downward. In one exemplary embodiment, angle $\theta_1$ may be in the range of about 6-18 degrees, but most optimally may be about 12 degrees.

Figure 3B:
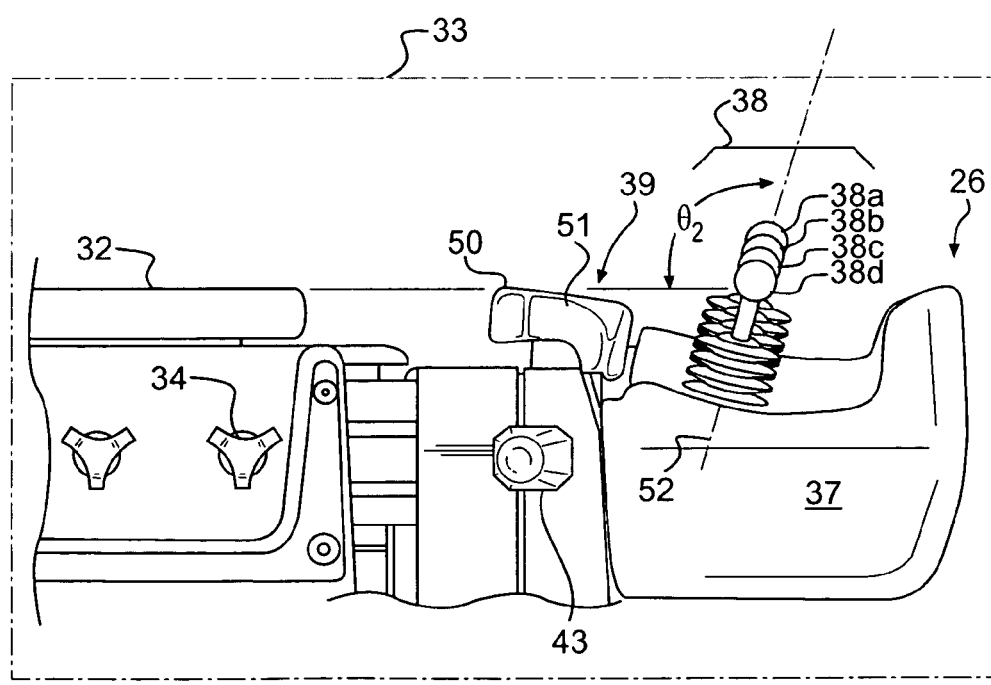
FIG. 3B is a side-view diagrammatic illustration of the control console of FIG. 3A.

In addition, as illustrated in FIG. 3B, neutral axis 52 of SALs 38 may be tilted forward away from a perpendicular intersection with armrest 32. Specifically, neutral axis 52 may be located at an angle $\theta_2$ relative to an upper surface of armrest 32 or, alternatively, a floor or ceiling surface of operator station 22. $\theta_2$, when viewed from outboard of control console 26 toward plane 33 may be within the range of about 98-105 degrees, but most optimally may be about 103 degrees. Angle $\theta_2$ may correspond with the natural angle at which the hand of an operator tends to tilt downward away from the forearm, when viewed from the outboard side of the hand.

Figure 3C:
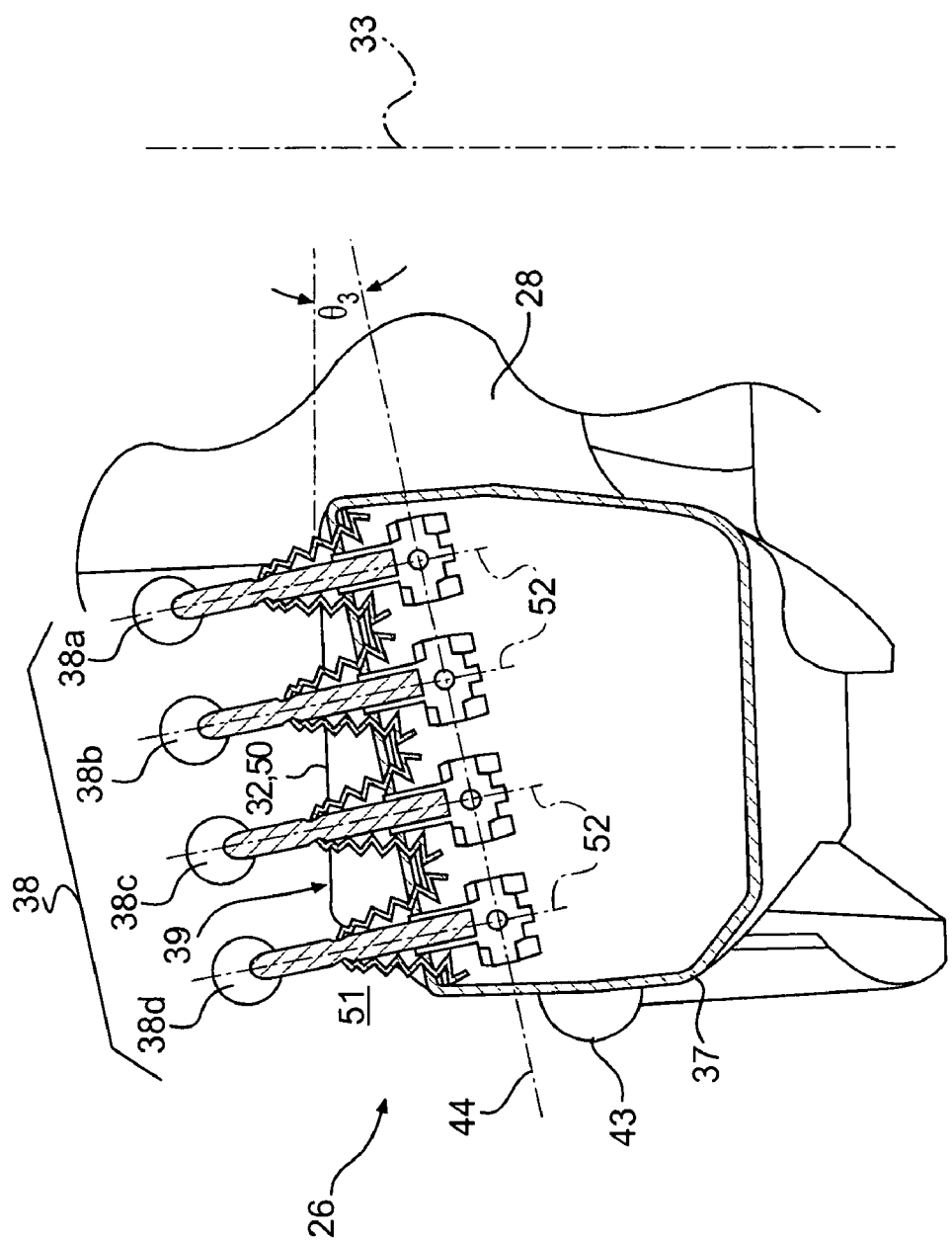
FIG. 3C is an end-view diagrammatic illustration of the control console of FIG. 3A.

Common axis 44 may also cant downward relative to plane 33 and/or the upper surface of armrest 32, as illustrated in FIG. 3C. In other words, the pivot point of SAL 38d may be vertically lower than the pivot point of SAL 38a. In one exemplary embodiment, a vertical angle $\theta_3$ between common axis 44 and the flat upper surface of armrest 32 may be in the range of about 8-15 degrees, and most optimally may be about 12 degrees. Angle $\theta_3$ may correspond with the natural angle at which the hand of an operator tends to cant outward away from the forearm, when viewed from the end of the hand. A similar or complementary angle may alternatively be measured between neutral axis 52 of SALs 38a-d and plane 33, if desired.

Oblique surface 51 of palm rest 39 may be substantially parallel with common axis 44, relative to both angles $\theta_2$ and $\theta_3$. Specifically, oblique surface 51 may be both tilted forward about 13 degrees from horizontal, and canted vertically downward away from the operator about 12 degrees. Although in some instances oblique surface 51 may be aligned with common axis 44 when palm rest 39 is in the lower position, it is possible for oblique surface 51 of palm rest 39 to be adjusted vertically out of alignment with common axis 44. In this situation, palm rest 39 may still remain substantially parallel to common axis 44.

INDUSTRIAL APPLICABILITY

The disclosed control console may be applicable to any machine requiring operator inputs to position and/or orient the machine or its work tools. The disclosed control console may effectively reduce operator fatigue by providing oft-used actuators for work tool or machine control in an ergonomically adjustable manner. The operation of optional control console 26 will now be explained.

During operation of machine 10, an operator may control multiple work functions with the same hand, with little hand and arm movement. Specifically, while the operator's palm is positioned on palm rest 39, all operator interface devices 38 may be simultaneously accessible. For example, SAL 38a may be actuated by the index finger, SAL 38b by the middle finger, SAL 38c by the ring finger, and SAL 38d by the little finger. It is contemplated that each of operator interface devices 38 may alternatively be otherwise actuated by any digit, if desired.

To relieve operator fatigue, operator interface devices 38 may be located in an ergonomic manner. For example, neutral axis 52 may be angled relative to the upper surface of armrest 32 by about 13 degrees, and common axis 44 may be rotated outward away from plane 33 and armrest 32 by about 12 degrees and canted downward away from plane 33 and the upper surface of armrest 32 by about 12 degrees. This specific angular arrangement may correspond with the natural placement of the hand relative to the forearm when at rest.

The location and design of palm rest 39 may complement the location of operator interface devices 38. In particular, oblique surface 51 of palm rest 39 may be tilted and canted to the same angles (e.g., $\theta_2$ and $\theta_3$) as common axis 44. This similar orientation may further relieve operator fatigue by supporting the palm of an operator's hand in the actuation position.

To further improve the ergonomic placement of operator interface devices 38 relative to the operator's hand in the rested position on palm rest 39, base 37 may be adjusted relative to armrest 32, and palm rest 39 may be adjusted relative to base 37. Base 37 may be adjusted by loosening fastening devices 34 to free arm member 30 within armrest 32, linearly sliding base 37 to the desired position in the fore/aft direction (e.g. along arrow 32a) relative to armrest 32, and retightening fastening devices 34. Palm rest 39 may be vertically adjusted by loosening fastening device 43 to free palm rest 39 relative to base 37, linearly sliding palm rest 39 to the desired vertical location, and retightening fastening device 43 to lock palm rest 39 in the desired position.

Other embodiments will be apparent to those skilled in the art from consideration of the specification and practice of the disclosed embodiments. For example, many different optional work tools may be controlled by operator interface devices 38. Additional or fewer features and/or functions may be controlled by operator interface devices 38. The features and/or functions may be controlled by various operator control devices, other than switches such as, for example, buttons, push/pull devices, levers, disk adjusters, and other operator control devices known in the art. It is intended that the specification and examples be considered as exemplary only, with a true scope of the disclosure being indicated by the following claims.

What is claimed is:

1. A control console associated with an armrest that extends from a seat in a forward direction generally parallel with a seat plane of symmetry and has an upper armrest surface intended to support an operator's forearm, the control console comprising:

a base operatively connected to the armrest;

at least one operator interface device operatively connected to the base and having a neutral axis inclined at an oblique angle relative to the upper armrest surface, wherein the at least one operator interface device is pivotal from the neutral axis in a fore/aft direction to initiate only a single function, the fore/aft direction defining a plane being angled outward away from the seat a predetermined angle relative to the forward direction of the armrest; and a palm rest separate from the armrest and located between the armrest and the at least one operator interface device to support a palm of an operator during manipulation of the at least one operator interface device.

2. The control console of claim 1, wherein the oblique angle is a composite angle including a first angle in the fore/ aft direction between the neutral axis of the operator interface device and the upper armrest surface, the first angle being within the range of about 98-105 degrees.

3. The control console of claim 2, wherein the first angle is about 103 degrees.

4. The control console of claim 2, wherein the composite angle also includes a second angle between a pivot axis of the operator interface device normal to the neutral axis and corresponding to the fore/aft direction, and the upper armrest surface, the second angle being within the range of 8-15 degrees.

5. The control console of claim 4, wherein the second angle is about 12 degrees.

6. The control console of claim 1, wherein the oblique angle includes an angle between a pivot axis of the operator interface device normal to the neutral axis and corresponding to the fore/aft direction, and the upper armrest surface, the angle being within the range of 8-15 degrees.

7. The control console of claim 6, wherein the angle is about 12 degrees.

8. The control console of claim 1, wherein the predetermined angle is within the range of about 6-18 degrees.

9. The control console of claim 8, wherein the predetermined angle is about 12 degrees.

10. The control console of claim 1, wherein the palm rest includes an oblique surface inclined in a first direction about 13 degrees relative to the upper armrest surface and canted in a second direction substantially orthogonal to the first direction about 12 degrees relative to the upper armrest surface.

11. The control console of claim 1, wherein the control console is adjustable relative to the armrest and the palm rest is adjustable relative to the control console.

12. The control console of claim 1, wherein the base is slidingly received by the armrest.

13. The control console of claim 1, wherein a space exists between the armrest and the palm rest.

14. A control console associated with an armrest extending from a seat in a forward direction generally parallel with a seat plane of symmetry and having an upper armrest surface intended to support an operator's forearm, the control console comprising:
a base operatively connected to the armrest; and
at least one operator interface device operatively connected to the base and having a neutral axis inclined at an oblique angle relative to the upper armrest surface, wherein the at least one operator interface device is pivotal in a fore/aft direction to initiate only a single function, the fore/aft direction being angled outward away from the seat a predetermined angle relative to the forward direction of the armrest
wherein:
the at least one operator interface device is a first operator interface device; and
the control console includes a second operator interface device having a pivot point aligned with a pivot point of the first operator interface device along an axis, wherein the axis is angled outward away from the seat the predetermined angle relative to the forward direction of the armrest and a neutral axis of the second operator interface device is also inclined at the oblique angle relative to the upper armrest surface.

15. The control console of claim 14, wherein the first and second operator interface devices are single axis levers.

16. A machine, comprising:
a work tool movable to accomplish a first function and a second function; and
an operator station associated with operator control of the work tool, the operator station including:
a seat having a plane of symmetry;
an armrest extending from the seat in a forward direction generally parallel with the plane of symmetry and having an upper surface intended to support an operator's arm; and
a control console adjustably connected to the armrest, the control console having:
a base slidingly received by the armrest;
a first operator interface device operatively connected to the base and having a neutral axis inclined at a first oblique angle relative to the upper surface of the armrest and at a second oblique angle relative to the upper surface and being substantially orthogonal to the first oblique angle; and
a second operator interface device operatively connected to the base and having a neutral axis inclined at the first oblique angle and the second oblique angle,
wherein the first and second operator interface devices are pivotal in a fore/aft direction from the neutral axis to each initiate only a single one of the first and second functions, the fore/aft direction defining a plan being angled outward away from the seat a predetermined angle relative to the forward direction of the armrest.

17. The machine of claim 16, wherein:
the first oblique angle is about 103 degrees;
the second oblique angle is about 12 degrees; and
the predetermined angle is about 12 degrees.

* * * * *